United States Patent [19]

Visa et al.

[11] 4,344,731

[45] Aug. 17, 1982

[54] EQUIPMENT FOR RAISING AN EXCHANGE PLATFORM OR CONTAINER TO A HORIZONTAL POSITION ABOVE THE LEVEL OF THE TRANSPORT POSITION

[75] Inventors: Heikki Visa, Vanhalinna; Heikki Laitinen, Raisio, both of Finland

[73] Assignee: Oy Partek AB, Finland

[21] Appl. No.: 181,364

[22] Filed: Aug. 26, 1980

[30] Foreign Application Priority Data

Oct. 19, 1979 [FI] Finland .............................. 793246

[51] Int. Cl.³ .............................................. B60P 1/64
[52] U.S. Cl. .................................. 414/471; 414/491; 414/498; 414/546
[58] Field of Search .............. 414/420, 421, 495, 498, 414/546, 555, 471, 491

[56] References Cited

U.S. PATENT DOCUMENTS

| | | | |
|---|---|---|---|
| 3,964,625 | 6/1976 | Wirz | 414/471 |
| 4,053,074 | 10/1977 | Lemaire | 414/495 |
| 4,204,793 | 5/1980 | Lemaire | 414/421 |

Primary Examiner—Robert G. Sheridan
Attorney, Agent, or Firm—Burns, Doane, Swecker & Mathis

[57] ABSTRACT

Equipment for loading an exchange platform onto a vehicle includes a rear frame pivotally mounted to the rear of the vehicle and a middle frame pivotally mounted on the rear frame. An angle piece has a horizontal portion pivotally mounted to the middle frame and a vertical portion with a grasping device at its upper end. A cylinder for operating the loading equipment is connected between the vehicle and the middle frame. In addition, a link arm and/or a second cylinder is provided between the vehicle and either the rear or middle frames to enable the exchange platform to be raised above the vehicle in a horizontal position.

5 Claims, 13 Drawing Figures

EQUIPMENT FOR RAISING AN EXCHANGE PLATFORM OR CONTAINER TO A HORIZONTAL POSITION ABOVE THE LEVEL OF THE TRANSPORT POSITION

BACKGROUND OF THE INVENTION

The subject of the present invention is equipment for loading of an exchange platform or container onto a truck or trailer and for removing same from the truck or trailer and for dumping the exchange platform or container. Such equipment comprises a rear frame mounted pivotably by means of a transverse, horizontal shaft or articulated joints placed at the rear end of the frame beams of the truck or trailer, to which rear frame a middle frame of the loading equipment is pivotably mounted at one of its ends by means of a transverse, horizontal shaft or articulated joints. At one end, or in immediate proximity of one end, of the middle frame an angle piece is pivotally mounted by means of a transverse, horizontal shaft or articulated joints around the rear end of its horizontal part or parts. The vertical part of the angle piece is at its upper end provided with a grasping means, such as, e.g., a hook, for the purpose of engaging a corresponding grasping component at the front wall of the exchange platform or container. A main cylinder or two parallel main cylinders for operating the loading equipment are arranged so that their one end is fastened to the frame of the truck or trailer and the other end to the middle frame of the loading equipment. For the purpose of pivoting the angle piece independently in relation to the middle frame, a cylinder-piston device is arranged arranged between the angle piece and the middle frame.

An equipment of this type is described in the Finnish Patent Application No. 783401. The object of the present invention is to make the functions of the equipment more versatile so that, by means of the equipment, in addition to the loading and unloading and dumping of an exchange platform or container, it is also possible to raise the exchange platform or container to a distance above the frame beams, preferably as so-called level raising.

SUMMARY OF THE INVENTION

The equipment in accordance with the invention is mainly characterized in that, in order to raise the exchange platform or container to a horizontal position above the level of the transport position, the middle frame of the loading equipment is arranged so that it can be raised to a horizontal position at a distance above the frame beams of the truck or trailer. This raising takes place by means of the main cylinder or main cylinders and is guided at least by the rear frame of the loading equipment, whereby, as viewed from the side, the middle frame and the rear frame form an obtuse angle between 90° and 180° opening towards the frame beams of the truck or trailer.

BRIEF DESCRIPTION OF THE DRAWING

The invention comes out more closely from the following description and from the attached drawings, wherein.

DETAILED DESCRIPTION

Figure 1:
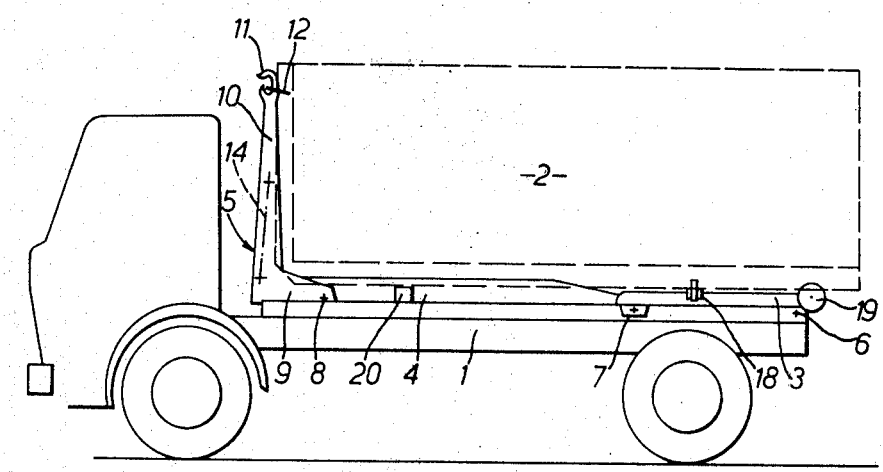
FIGS. 1 to 4 are schematic side views of a truck provided with a loading equipment of the hook device type at different stages of loading.

The loading equipment comprises three frame parts: the rear frame 3, the middle frame 4, and the angle piece 5. The rear frame 3 is at its rear part, by means of articulated joints 6, fastened to the rear end of the frame beams 1 of a truck. The rear frame 3 can pivot around the articulated joints 6 in relation to the frame beams 1, i.e. the rear frame 3 can be pivoted in relation to the frame beams 1 into the ordinary dumping position. As is shown in the figures, the rear end of the rear frame 3 is provided with support rollers 19 for supporting and guiding the exchange platform 2 during loading. The rear frame 3 also includes a locking device 18 for locking the exchange platform onto the loading equipment. A middle frame 4 is at one of its ends pivotally fastened to the rear frame 3 by means of a transverse, horizontal shaft 7 or articulated joints. Two parallel main cylinder-piston devices 13 are arranged between the middle frame 4 and the frame beams 1 of the truck.

Figure 6:
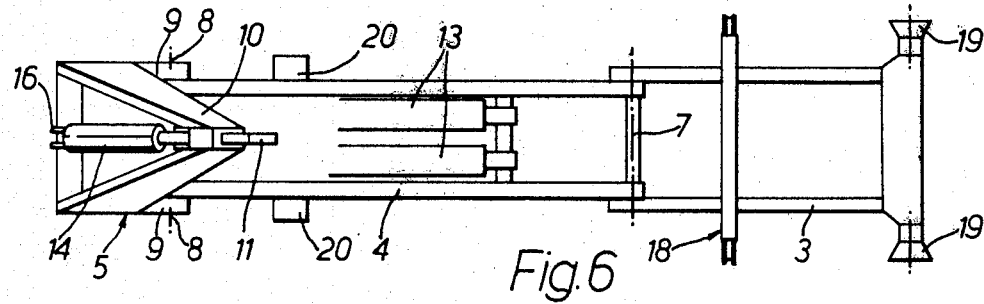
FIG. 6 shows the loading equipment as viewed from above.

An angle piece 5 is fastened to the front end of the middle frame 4 or to immediate proximity of the front end of the middle frame 4 and is pivotable at the rear ends of the horizontal parts 9 in relation to a transverse horizontal shaft or to articulated joints 8. The vertical part 10 of the angle piece 5 is at the upper end provided with a grasping means, such as a hook 11, for engaging the corresponding grasping component 12 at the front wall of the exchange platform 2 or container. For the purpose of pivoting the angle piece 5 independently in relation to the middle frame 4, a cylinder-piston device 14 is arranged between the angle piece 5 and the middle frame 4. The front end of the middle frame 4 extends forwards beyond the articulated joint 8 between the angle piece 5 and the middle frame 4 a distance substantially corresponding to the length of the horizontal parts 9 of the angle piece 5. The cylinder piston device 14 placed between the angle piece 5 and the middle frame 4 is at one of its ends fastened to the vertical part 10 of the angle piece 5 and at the other end to the front end of the middle frame 4 ahead of the articulated joint 8 between the angle piece 5 and the middle frame 4 so that the cylinder-piston device 14 is positioned in the intermediate space between the branches of the angle piece 5 (FIG. 6).

In FIG. 1, an exchange platform 2 is placed on the frame beams 1 of a truck in the transport position. The bottom beams of the exchange platform 2 lie, at their rear ends, on the support rollers 19 in the rear part of the rear frame 3 and, at their front ends, on the supports 20 placed on the sides of the middle frame 4. Moreover, the hook 11 of the angle piece 5 is engaged on the grasping component 12 of the exchange platform 2. The exchange platform 2 is at the bottom edges of its bottom beams, which are, e.g., I-beams, at the outer edges locked by means of a locking device 18 in relation to the rear frame 3.

Figure 2:
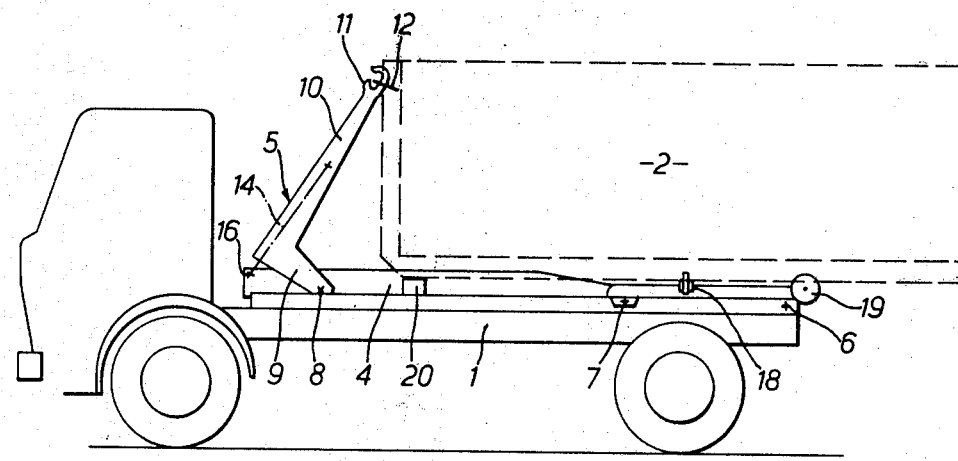

When the locking means 18 are opened in the stage shown in FIG. 1, the exchange platform 2 can be shifted backwards by bending the angle piece 5 to the position shown in FIG. 2. The length of the span corresponding to the maximum length of the track of the shape of an arc of a circle of the grasping means 11 of the angle piece 5, produced by the stroke length of the cylinder-piston device 14 placed between the angle piece 5 and the middle frame 4, is substantially double as compared with the length of the horizontal part or parts 9 of the angle piece 5, and the vertical part 10 of the angle piece 5 is essentially longer than the horizontal part or parts 9 of the angle piece 5.

Figure 3:
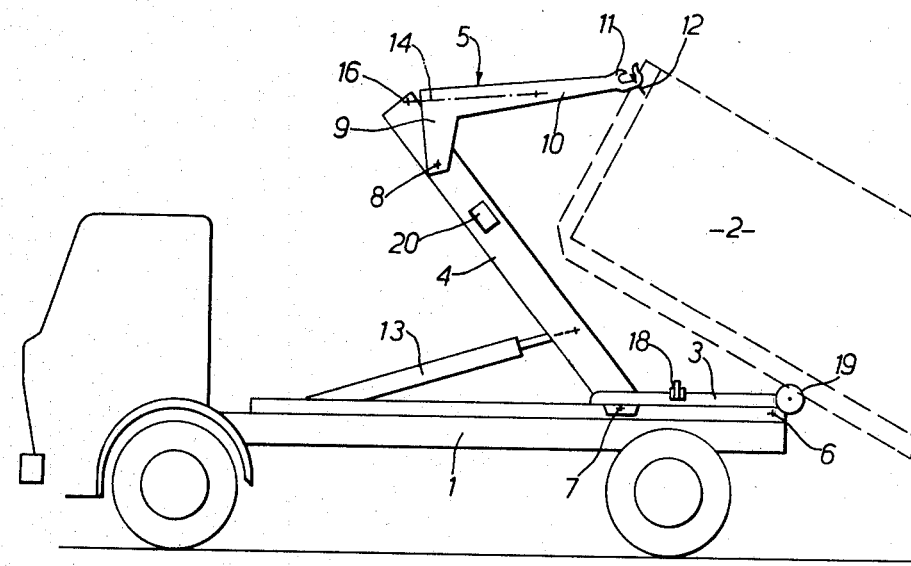
Figure 4:
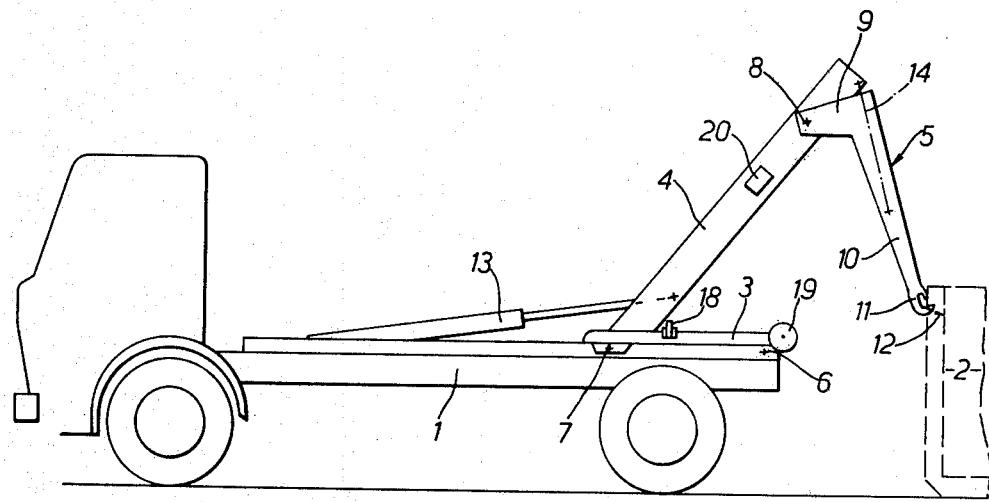
Figure 5:
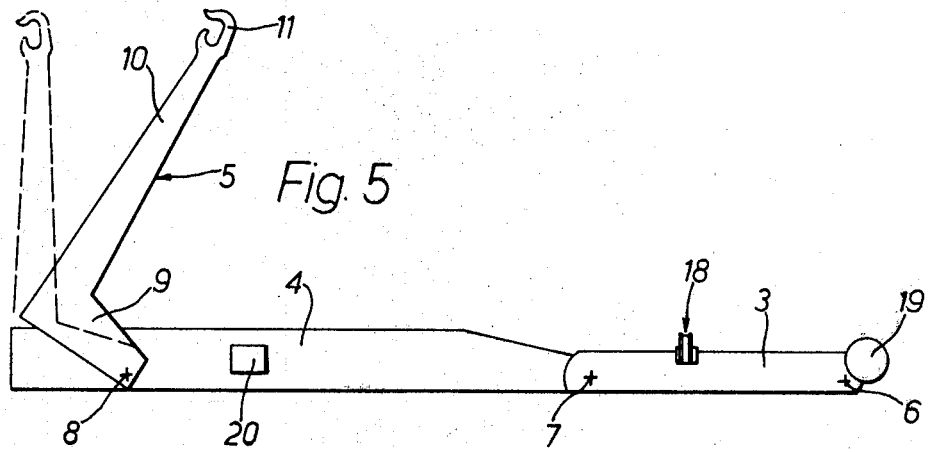
FIG. 5 is a side view of the loading equipment.

From the stage shown in FIG. 2, by means of the main cylinders 13, the middle frame 4 can be pivoted in relation to the horizontal shaft 7 to the position shown in FIG. 3 and further to the position shown in FIG. 4, at which the exchange platform is removed from the truck chassis down onto the ground. When the truck is driven forwards from said stage (FIG. 4), the hook 11 of the angle piece 5 is detached from the grasping component 12 of the exchange platform 2.

The pulling of an exchange platform 2 from the ground onto the chassis of a truck takes place in the order opposite to that described above. First, the grasping component 12 of the exchange platform 2 is engaged by the hook 11 (FIG. 4), the middle frame 4 is pivoted in relation to the horizontal shaft 7 (FIG. 3) by means of pulling movement of the cylinder-piston device 13 until the stage shown in FIG. 2 is reached. Hereupon the angle piece 5 is pivoted by means of the cylinder-piston device 14 so that the exchange platform 2 is pulled to the front position (FIG. 1), at which position the exchange platform 2 is locked by means of the locking device 18.

Figure 7:
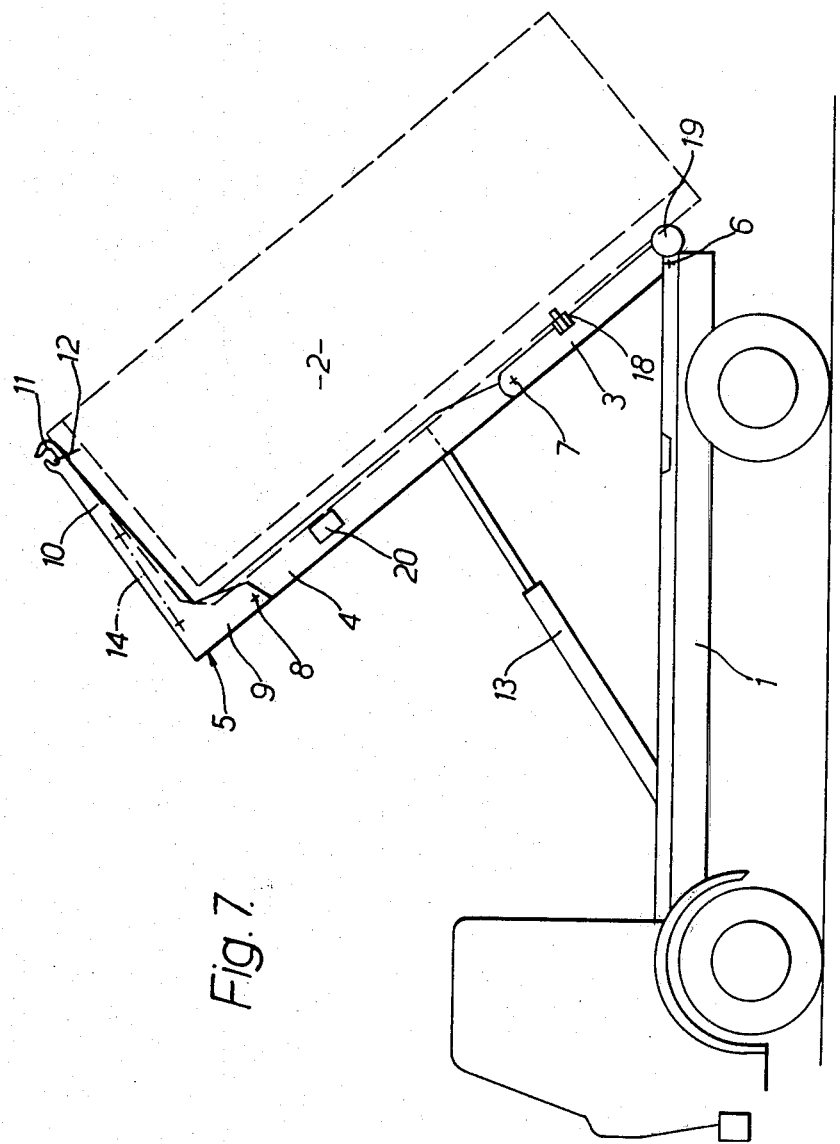
FIG. 7 shows a truck provided with a loading equipment as a side view with the exchange platform in the dumped position.
Figure 8:
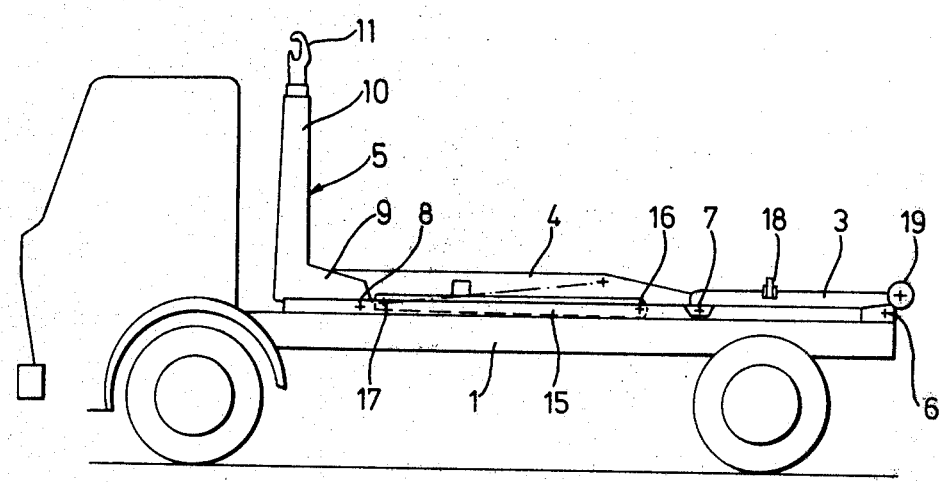
FIGS. 8 to 11 are schematic side views of different stages of the level raising of the exchange platform taking place by means of the loading equipment of the hook device type.
Figure 9:
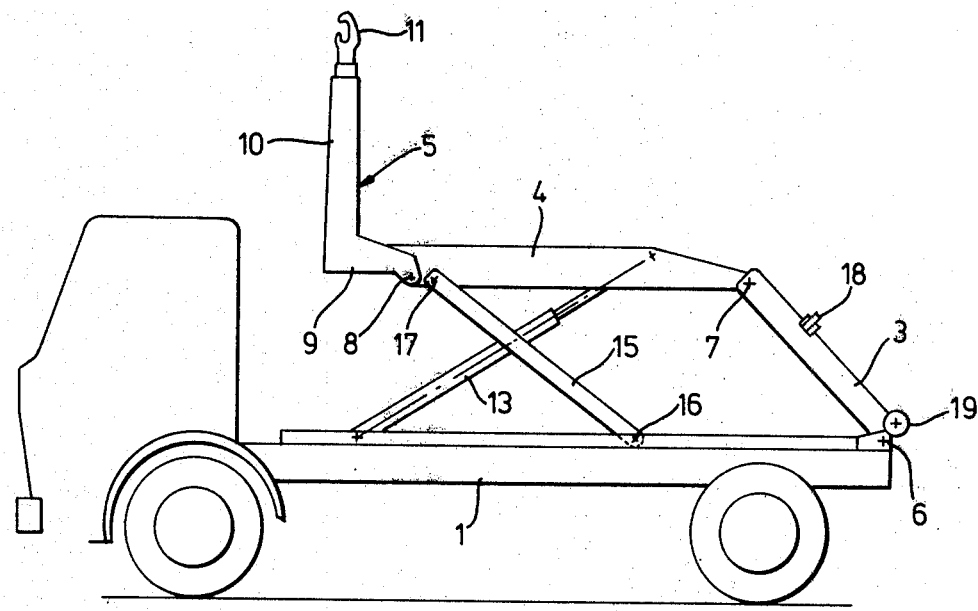

If one wishes to dump the exchange platform 2 by means of the loading equipment, in the stage of FIG. 1 or of FIG. 2 the locking device 18 is kept in the locked position and the dumping movement is performed by means of the main cylinders 13 as shown in FIG. 7. Then, consequently, the loading equipment is, at the rear frame 3, locked by the locking device 18 to the bottom beams of the exchange platform, and the three parts of the loading equipment, i.e. the angle piece 5, the middle frame 4, and the rear frame 3, as supported by the exchange platform, are pivoted in relation to the articulated joints 6.

Reference numeral 20 denotes the support pieces of the exchange platform 2, fastened to the middle frame 4.

For the purpose of performing the level raising of the exchange platform 2, front support arms 15 are fastened to the frame beams 1 of the truck by means of articulated joints. The articulated joints 16 between the front support arms 15 and the frame beams 1 are stationary. At their opposite ends the front support arms 15 are fastened to the front end of the middle frame 4 by means of articulated joints 17. The articulated joints 17 are designed to be openable so that, when the loading or unloading of an exchange platform 2 in accordance with FIGS. 1 to 4 or the dumping of an exchange platform 2 in accordance with FIG. 7 is performed by means of the loading equipment, the front support arms 15 are at their front ends detached from the middle frame 4 and lie on the frame beams 1. For the purpose of level raising of the exchange platform 2 the front ends of the front support arms 15 are fastened to the middle frame 4. The articulated joints 17 must, of course, be simply and rapidly openable and lockable and, moreover, they must have some play in the longitudinal direction of the front support arms 15 to facilitate the raising of the middle frame 4 at the initial stage of the raising. When the front support arms 15 are fastened to the middle frame 4 and the middle frame 4 is raised by means of the main cylinder-piston devices 13, the middle frame rises in the horizontal position as guided by the front support arms 15 and the rear frame 3. The front support arms 15 and the rear frame 3 are parallel to each other. When level raising of the exchange platform 2 is performed, the locking device 18 of the rear frame 3 must, of course, be in the open position. When level raising is performed, as viewed from the side, the middle frame 4 and the rear frame 3 form an obtuse angle between 90° and 180° opening towards the frame beams 1 of the truck or trailer.

Figure 10:
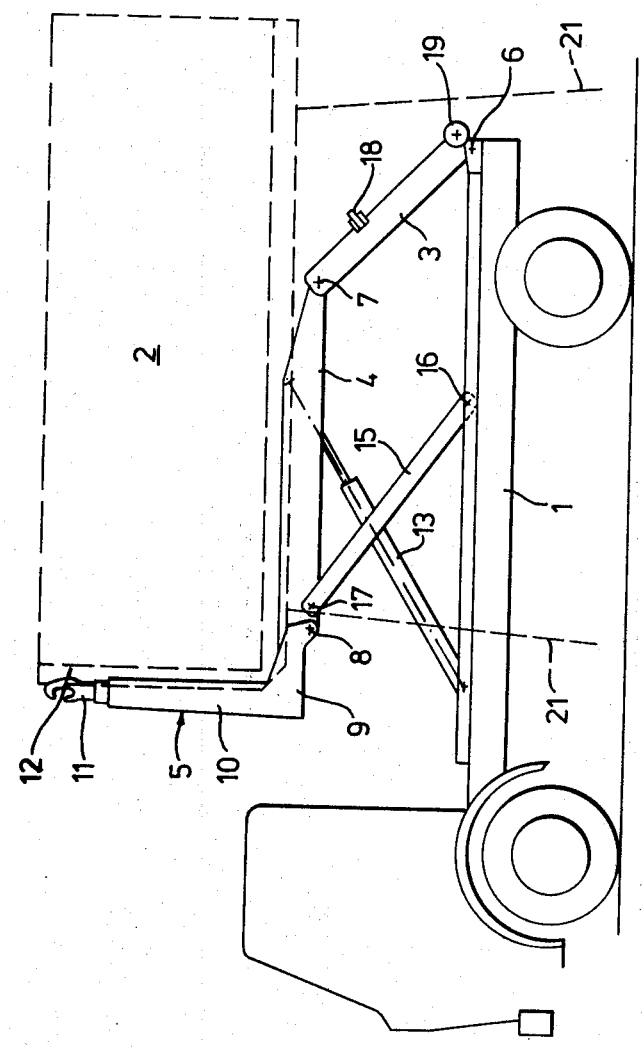

After the exchange platform 2 has been raised up to the position shown in FIG. 10, the support legs 21 of the exchange platform 2 are fitted or pivoted to the support position and the exchange platform is lowered onto the legs 21.

Figure 11:
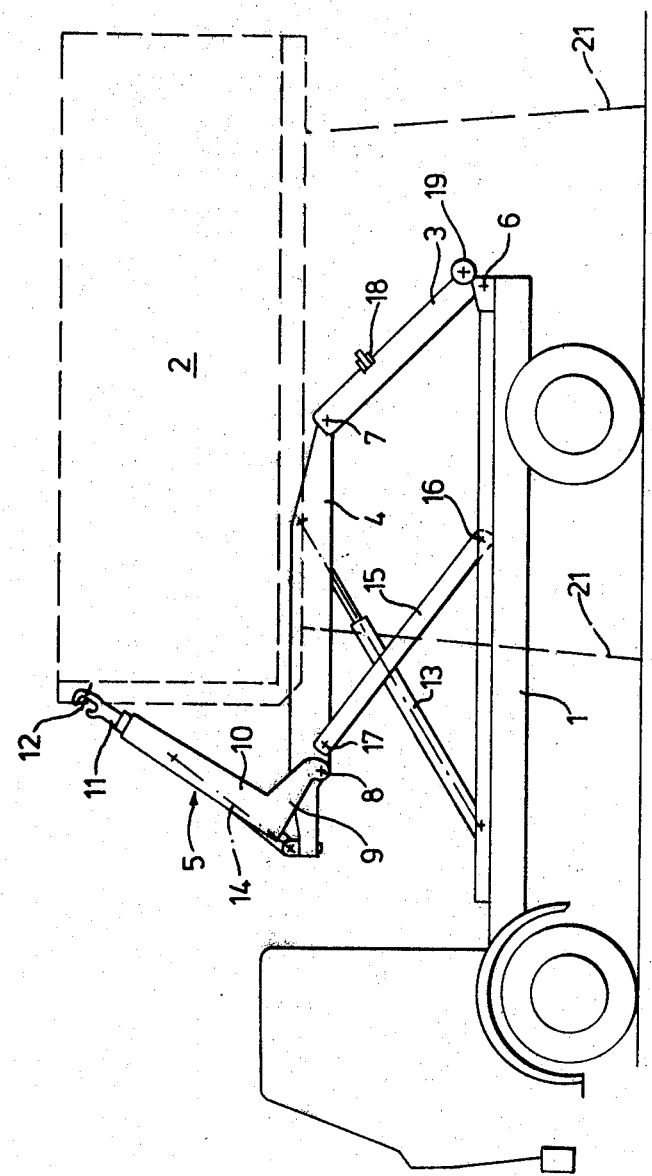
Figure 12:
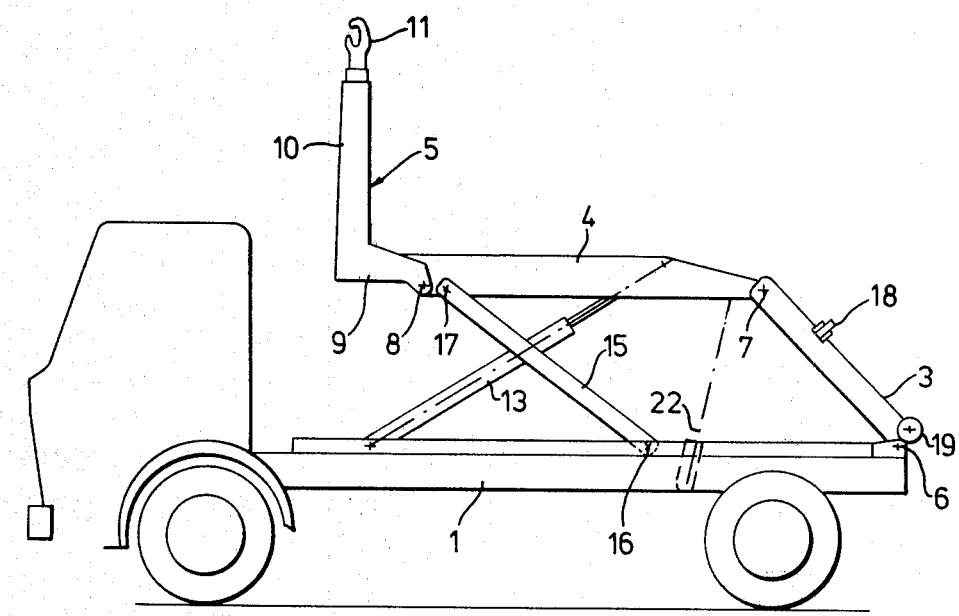
FIG. 12 shows the arrangement of an additional cylinder-piston device for the loading equipment shown in FIGS. 8 to 11.

Hereupon the truck is driven forwards and, at the same time, the angle piece 5 is pivoted as shown in FIG. 11. When the angle piece 5 is pivoted to a sufficient extent and the middle frame is additionally lowered as required, the grasping hook 11 can be detached from the grasping component 12 of the platform 2 and the truck can be driven away from underneath the platform. The loading of a platform 2 standing on its legs 21 takes place in the order opposite to that described above. For extremely heavy service, an additional cylinder-piston device 22 can be mounted to the loading equipment in accordance with FIG. 12. The additional cylinder-piston device 22 is fastened to the frame beams 1, but it is not fastened to the arm construction of the loading equipment, but the arm construction has, at the rear part of the middle frame 4 or at the front part of the rear frame 3, preferably near the articulated joint 7, a counter-point operative with the free upper end of the piston rod of the additional cylinder-piston device 22, whereby the contact face between these can be, e.g., part of a spherical face.

Figure 13:
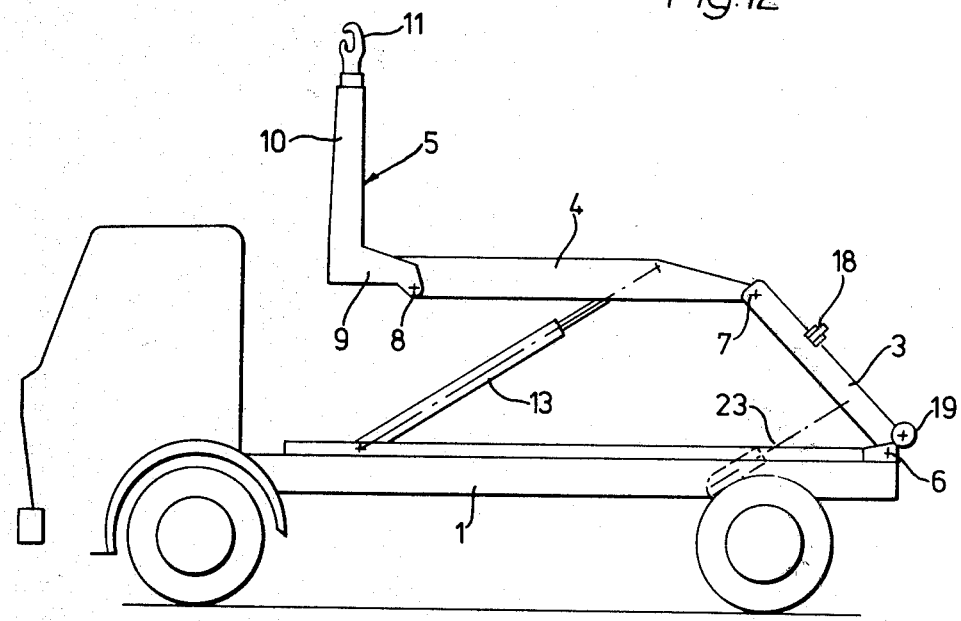
FIG. 13 shows an alternative constructional embodiment for the loading equipment shown in FIGS. 8 to 11.

FIG. 13 shows a construction alternative to the embodiment shown in FIGS. 8 to 11, in which no front support arms 15 are needed at all. In this embodiment a locking means, such as a cylinder-piston device 23, is fitted between the rear frame 3 of the loading equipment and the frame beams 1 in order to lock the rear frame 3 into a certain angle in relation to the frame beams 1. In this embodiment the level raising of the exchange platform 2 can be performed by using the main cylinders 13 and the cylinder-piston device 23 simultaneously. In this embodiment it is also possible to first keep the locking device 18 of the rear frame 3 in the locked position so that the exchange platform 2 is dumped in the normal way as shown in FIG. 7. Hereupon the rear frame 3 is locked by means of the cylinder-piston device 23 to the frame beams 1 and the locking device 18 of the rear frame 3 is opened, whereupon, with the aid of the main cylinders 13, the middle frame 4 and the exchange platform 2 can be pivoted downwards in relation to the articulated joints 7 until the middle frame 4 is in the horizontal position.

What we claim is:

1. Equipment for loading an exchange platform onto a vehicle, removing same from the vehicle, and dumping the exchange platform, comprising:
- a rear frame pivotally mounted to the rear end of the frame of the vehicle;
- a middle frame pivotally mounted at one of its ends to said rear frame;
- an angle piece pivotally mounted proximate the other end of said middle frame, said angle piece including a vertical portion and a grasping component at the upper end of said vertical portion;
- a piston and cylinder device connected between the vehicle frame and the middle frame; and
- means for maintaining said middle frame in a substantially horizontal raised position when said piston and cylinder device is actuated to move said middle frame and pivot said rear frame relative to the vehicle frame, thereby forming an obtuse angle between said rear and middle frames.

2. The equipment of claim 1 wherein said maintaining means comprises means for locking said rear frame in position at a predetermined angle relative to the frame of the vehicle.

3. The equipment of claim 2 wherein said locking means comprises a cylinder-piston device connected between said rear frame and the frame of the vehicle.

4. The equipment of claim 1 wherein said maintaining means comprises support arms connected between said middle frame and the frame of the vehicle in an arrangement parallel to said rear frame to thereby form a parallelogram comprising said middle frame, said rear frame, the vehicle frame and said support arms.

5. The equipment of claim 1 or 4 wherein said maintaining means includes a cylinder piston device connected between the vehicle frame and a point on one of said middle frame and said rear frame that is proximate their pivotal connection.

* * * * *